United States Patent Office 3,435,676
Patented Apr. 1, 1969

3,435,676
APPARATUS FOR MEASURING THE RATE OF FLOW AND DIRECTION OF A GAS STREAM
Egon Brückner, Ebermannstadt, and Ingo Westerboer, Erlangen, Germany, assignors to Oskar Vierling, Ebermannstadt, Germany
Filed Sept. 15, 1966, Ser. No. 579,658
Claims priority, application Germany, Apr. 16, 1966, V 30,867
Int. Cl. G01w 1/02
U.S. Cl. 73—189         5 Claims

ABSTRACT OF THE DISCLOSURE

A variometer for measuring gas direction and velocity having a probe which is part of a Wheatstone bridge, which probe is positioned in the gas flow passage and is made up of two coilings of metal wire each formed as a truncated cone, connected in series, and arranged so that their truncated ends are adjacent each other to form a double frusto-cone whose axis is parallel with the flow of gas. The output voltage of the bridge is connected to an amplifier which in turn is connected to a transducer for acoustic indication and an indicating instrument for visual indication.

---

The invention concerns apparatus for measuring the rate of flow and direction of a gas stream called forth by differing pressure ratios, with optical and acoustic reading of the measurement obtained, in particular for ascertaining the vertical component of speed of an aircraft.

Knowledge of the vertical component of speed at the time concerned, i.e. the rate of climb or sinking speed, is important with power flight for the purpose of accurate control, in particular with instrument flying; with gliding flight it is essential, as there the ascending air current areas must be made use of in order to obtain the necessary height. Measuring apparatus for the vertical component of speed, what are known as air pressure variometers or, in brief, variometers, measure the rate of climb or sinking speed generally speaking by using the velocity of an air current which through alteration in air pressure, on change of height is set up between the outside air and a compensator vessel. In a climb, this compensating flow streams from the compensator vessel to the outside, since the pressure of the outside air drops, whereas on a drop in height the pressure of the outside air becomes greater and brings about an air flow in the opposite direction. The rate of flow of the compensating stream concerned is a ratio of the corresponding vertical component of speed.

The known variometers, which measure the rate of flow of the compensating air flow and show this as the vertical component of speed of the aircraft, for the most part operate mechanically; to this category belong dynamic air pressure variometers and capsule variometers, the latter having the compensating air flow choked by a capillary tube and the resulting pressure difference is shown by a pressure gauge. All mechanical variometers have, however, very great inertia and are not sufficiently sensitive in relation to slow flow speeds, with the result that in areas with weak ascending air currents they do not respond at all, and in limited upward current zones frequently show a rise only when the aircraft has already left the said zone. Accordingly the tendency recently has been to change over to the use of electric variometers, which, besides having the advantages of greater sensitivity and less response delay, also provide possibilities for the reversal of the measurement range and for attachment to electrical equipment. The known electric variometers contain pyroelectric conductors or thermistors, to take up the value measured, i.e. resistors with negative thermal coefficient of resistance. Two such pyroelectric conductors are arranged in tandem in the channel through which the compensating air current flows, and together with two further resistors form a bridge circuit. In the state of rest both pyroelectric conductors are heated to a temperature of for instance 180° C. When air flows through the compensating channel it cools the said conductors, the conductor that is lying first in relation to the direction of flow being more strongly cooled than the second one. Because of the difference in the degree of cooling, the conductors assume differing resistance values, and the bridge is out of phase. Accordingly an indicating instrument in the diagonal branch of the bridge now shows a voltage which corresponds to the temperature difference of the conductors, and thus to the flow speed of the air. Frequently an audio-frequency generator is arranged parallel to the said instrument with electric variometers, which oscillates as the indicator values increase from zero at a frequency that is higher in proportion to the increased output voltage of the bridge.

Though variometers with pyroelectric conductors do not show any disturbing delay in indicating response, and have the advantages enumerated above for electric measurement apparatus, they have other, serious disadvantages: the characteristic lines of pyroelectric conductors, which give the resistance as a function of the temperature, are not linear and are scarcely the same for two consecutive samples. By admeasuring and by using additional circuits it is possible to obtain coincidence at one point, or possibly also over a small range of the characteristics, but above and below that area the characteristics diverge, with the result that the indicator values fluctuate strongly with the surrounding temperature and the filament energy consumption, and the position of the zero point wanders similarly. Changes in the characteristic lines due to ageing increase this effect still further, since the two elements are, in general, differently affected by the said alterations; the result is that with changing temperatures or alterations in the operating voltage, little trust can be placed on the indicator values. It is even possible for a climbing speed to be simulated by the shifting of the zero point, when in actual fact the aircraft is lying horizontally or is losing height. It is not possible without auxiliary equipment to recalibrate the zero position in flight, because no point of reference is available. Moreover there is danger to the pilot and to the aircraft if the demands made by the variometer are so excessive that the pilot cannot give the necessary attention to his surroundings. When using pyroelectric conductors it is extremely difficult, because of the said nonlinear characteristic, to obtain an instrument displacement that increases linearly with the vertical component of speed. In addition, the flows in the region of the pyroelectric conductors form differently in accordance with the speed, since the spherical shape of the said pyroelectric conductors (dwarf resistors with negative temperature coefficient—NTC) gives rise to the formation of swirls in the air flowing through. With slight flow-through speeds the turbulence issuing from behind the first pyroelectric conductor gives a stronger measurement result than at high speeds, however, so that the indicator is liable to inaccuracy also in this respect.

Before changing over to the use of electric variometers with pyroelectric conductors an attempt was made to transfer to the variometers the hot-wire method already known from other spheres of application. These attempts foundered because no suitable suspension method could be found for the hot-wire. It is customary in the technique for the heated wire to be suspended in tension between resilient holding members. In order to give the electric variometers the desired sensitivity in relation to the smallest amounts flowing through, the hot-wire in this case had to be considerably shorter than with known arrangements. A very short wire does not, however, lend itself to being suspended in the conventional way, as disproportionately high disturbing effects are called forth by the said holding member. Over and above this, short lengths of wire give low resistance values, and this again necessitates high currents for the heating-up. For these reasons the idea of an electric hot-wire variometer never got beyond the prototype stage, and subsequently use was made exclusively of the construction described of electric variometers with pyroelectric conductors.

The invention herein provides a novel solution which combines the advantages of electric variometers: i.e. high sensitivity, slight response delay, the possibility of reversing the measurement range, connection to electrical equipment and so on, with those of mechanical variometers: i.e. resistance to ageing, linear interdependence of measurement and indicator values, independence of temperature, zero point stability and so on, without showing the disadvantages peculiar to either method. In the arrangement of the invention the gas flow determining the vertical component of speed is likewise passed via a temperature sensitive measuring probe which forms a part of a Wheatstone bridge circuit, and the output voltage of the bridge is applied via an amplifier to an indicator instrument for optical indication to be given, and also to an oscillator with connected loudspeaker, for the acoustic indication to be given. The feature of this arrangement of the invention is, however, that the measuring probe consists of two coilings of in each case a plurality of windings of a metal wire, both coilings being arranged in series for the gas flow, with their winding surfaces extending transverse to the said gas flow. As a result, two opposing requirements are reconciled, which consist in that on the one hand one needs great lengths of wire in order to produce the necessary filament energy consumption, and on the other hand it is desirable for the probe to have small dimensions in order to obtain high indicator sensitivity with low indicator inertia.

A specially advantageous embodiment of this probe has the feature that the two coilings are both constructed in the form of a truncated cone and are arranged to abut against each other by their small top surfaces. Further details will be given below regarding the advantageous properties brought about by this shape.

In a further development of the invention, in order to avoid completely the use of a support member for the probe, the coilings are provided with a coating of lacquer which holds their windings firmly in the coiled position, the probe thus being self-supporting.

Actual experience has shown that the use of insulated nickel is advantageous as material for the coilings of the probe, from the economic and manufacturing standpoint and also as regards measurement technique.

A measurement system using the probe that has been described has the feature of high sensitivity and accuracy in relation to linearity and zero point stability. In a further development of the measuring system of the invention, the indicating system controlled by the probe makes use of these properties by arranging the two coilings of the probe in the way known per se in a Wheatstone bridge circuit, the output voltage of which is applied, also in the known way, to an indicator instrument via an amplifier provided with means for reversing the range, and furthermore controls a tone-frequency oscillator. In this arrangement the output voltages of the bridge which bring about positive indicating values at the instrument increase the frequency of the oscillation, whereas the output voltages of the bridge which bring about negative indicating values at the instrument cause the frequency of the oscillator to drop. An acoustic indicator giving values for the rate of vertical climb as well as for the rate of vertical descent of course has considerable advantages over the conventional indicator, which is limited to indicating the climbing speed only, since it gives the pilot an acoustic warning, also in descending flight, of coming changes and hazards. The pre-requisite with such an indicator is that the measurement value receiver, here the probe, must show little inertia in reacting, must provide an indicating value that is proportional to the measurement value and furthermore must not cause any simulated indications (shifting of the zero point). If these pre-requisites are not fulfilled, acoustic indication of the vertical component of speed in both directions merely leads to confusion and imperils the pilot; accordingly the type of indicator developed in the invention is suitable only in conjunction with the new probe.

In order to increase the security of the acoustic indication still further, a sharp distinction is advantageously made between the two directions deviating from the horizontal. This saves the pilot from having to make a decision whether the sound heard is pertinent to upward or to the downward movement. A particularly effective way of indicating such difference is to keep the sound in one direction continuously audible, whereas in the other direction from zero onward it is continually interrupted for short periods. In a further development of the invention the system is for this purpose supplemented by a vibrator lying parallel to the oscillator and, similarly to the latter, controlled via the amplifier by the output voltages of the bridge circuit, but which in this case can be connected-in only by the output voltages corresponding to one indication direction (either positive or negative values). From the standpoint of industrial production it is immaterial which oscillations are chopped from the zero position onward, i.e. the frequencies of the climb range or those of the descent range. In the opinion of the pilot however, the continuous sound is more easily associated with descent and the intermittent sound with climbing, and accordingly in a practical embodiment of the system of the invention this is the arrangement met with.

The invention will now be described with reference to an example shown in the accompanying drawing, and the way of functioning will be described.

Figure 1:
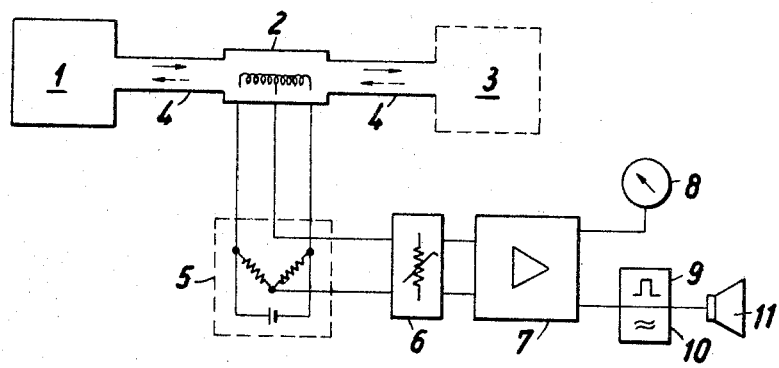
FIGURE 1 shows a block diagram of the system for measuring the speed and direction of a gas stream with optical and acoustic indication of the measurement result.
Figure 2:
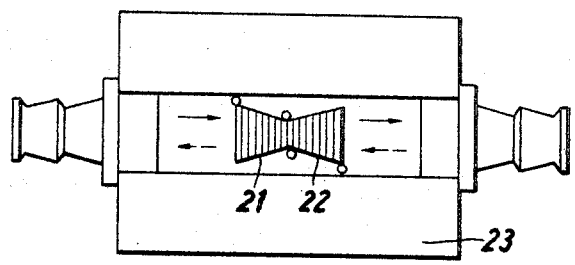
FIGURE 2 shows the probe inserted in the arrangement of FIGURE 1 as measurement value receiver.

The measurement system of FIGURE 1 contains a conventional compensator vessel 1 of known construction that is connected via a flow channel 4 with the outside air and with the withdrawal place for what is called the static pressure 3. In the said flow channel 4 is located the probe 2, which in FIGURE 2 consists of two truncated cone-shaped coilings 21, 22 each having a plurality of windings of a metal wire. The said probe is encased in a metal block 23 through which only the ends of the coilings project. The inner terminals of both coilings are connected together and the whole probe accordingly forms one branch of a Wheatstone bridge circuit 5, in the other branch of which two ohmic resistors are connected. The center taps of probe and bridge resistors pass to an amplifier 7, the input terminals of which are connected in parallel to reversible resistors 6 for the adjustment of sensitivity (reversal of the measurement range). A voltmeter 8 as indicating instrument for optical indication, an oscillator 10 and a vibrator (chopper) 9 with post-connected loudspeaker 11 for the purpose of acoustic indication are connected to the amplifier output.

When the aircraft climbs, air flows out of the compensator vessel 1 as a result of the reduced external pressure, in the direction shown by the arrows through the channel 4 in which the probe 2 is located. The said probe is heated in the rest state to a surface temperature of over 100° C., but because of the particular shape of the probe the temperature is not the same at all points of the surface but increases towards the centre where the two coilings 21, 22 come upon each other, as there the distance from the walls of the metal block 23 and accordingly the heat resistance, is greater than at the outside edges. The air flowing in from the left cools the left-hand coiling 21 to a greater or lesser extent in accordance with the velocity of flow and accordingly reduces the ohmic resistance of the wire. While this process is going on the air itself is warmed, i.e. by the hot centre of the probe passing to a higher temperature than that of the right-hand coiling 22 in the centre. Accordingly, the coiling 22 even experiences an increase in temperature by reason of the air flow, instead of the customary comparatively slight cooling-off, and with it shows an increase of resistance. As the output voltage of the bridge circuit 5 is proportional to the difference of the two coiled resistors 21, 22, the effect described brings about a considerable increase in response sensitivity.

With slight vertical components of speed the volume of air transported through the probe per unit of time is so small it takes several seconds to pass through the whole longitudinal extent of the probe coilings. The undesirable indication inertia with small indication values that this causes is substantially offset by the special construction of the probe, because the greatest contribution to the indicating is brought about by the comparatively hot, and in comparison with the total extent of the probe, much smaller centre portion.

In addition the shape of the probe improves linearity between measurement value and indicating value. The probe itself can be considered as a linear constructional element, as the alteration in its resistance is exactly linear to the temperature change. The post-connected electrical systems can also be constructed to work linearly, of course, up to an upper limit value. Deviations in linearity are accordingly to be feared only in the ratio of temperature difference (degree of cooling off) to the velocity of flow. Practical tests, which have been confirmed from various quarters, have shown that the temperature difference with the average and higher velocities of flow is a linear function of the velocity of the air flow, but that with very low flow velocities the linear function is abandoned for smaller values. With cylindrically shaped probe and accordingly even temperature distribution on its surface, a very slow air flow called forth no perceptible cooling-off at all, in any case no distinct cooling-off of the two coilings; in actual practice there was rather more the reverse effect, i.e. the coiling second in the direction of flow was more strongly cooled than the first. With the probe described above, this error cannot occur; the slower the movement of the air through the hotter centre, the more strongly will it be heated. Even if the air flow is too weak to cool off effectively the first coiling, it will still warn the outer, cooler parts of the second coiling and accordingly will again give a correct indication. By the increase in sensitivity described at the lower measurement limit accordingly the whole function is substantially linearized.

At the upper output of the bridge circuit 5, when the air, as has been assumed above, flows from left to right, and with the polarity of the battery as shown, there is a voltage that in comparison with the reference voltage at the common point of the two lower resistors, is positive, and the height of which is proportional to the velocity of flow. With reversed direction of flow the voltage at the upper bridge output is accordingly negative in relation to the reference voltage, and in the state of rest the bridge is compensated and does not supply any voltage, or supplies the same voltage at both outputs. Of course this type of polarity is not obligatory, and can optionally be reversed. The two comparison resistors of the bridge can moreover be relatively large compared with the ohmic resistors of the coilings, since in relation to the voltage supply they form their own branch and do not influence the extent of the bias of the circuit taken at the centre tap of the coilings.

At the two outputs of the bridge circuit 5 a known differential amplifier 7 with high zero point stability is connected. For reversing the measurement range, resistors 6 can be connected in parallel to the amplifier input, which divide down the high voltages occurring with high flow velocities, before they are amplified. In this way both the amplifying range of the amplifier 7 and also the indicating range of the instrument 8 and the acoustic range of the oscillator 10 are used up to the maximum, without the great indicating precision being a burden with small measurement values on the whole measurement range used, and without the exactness at the lower limits being impaired by the large measurement values indicated.

At the output of the amplifier 7 a voltmeter 8 is connected, the pointer of which in the rest position is central. The scale of the instrument is calibrated in m./sec. and shows positive values in one direction from the central position, i.e. rate of climb, and in the other direction negative values, i.e. sinking speed. The centre position which corresponds to the voltage difference zero at the output of the bridge 5 can coincide with the mechanical zero point of the instrument, though this is not obligatory if between the bridge circuit 5 and the instrument 8 there is in the known way a displacement in potential in one or the other direction, so that at the output of the amplifier for instance only negative voltages occur, the mid-value of which corresponds to the indicating value zero, whereas the overlying voltages give positive indicating values and the underlying voltages negative indicating values. Such measures are routine for the expert, and accordingly do not need to be explained.

The amplifier 7 is moreover connected on the output side with a chopper 9 and an acoustic oscillator 10, in each case of known construction. The oscillator produces vibrations the frequency of which is a function of the output voltage of the amplifier and accordingly of the output voltage of the bridge circuit 5. The higher the bridge voltage of the polarity is, which corresponds to the direction of flow from left to right, i.e. to the climb of the aircraft, the greater will be the oscillator frequency also on the other hand the greater the bridge voltage is, with reverse indication, the smaller will be the oscillator frequency. Accordingly the attached loudspeaker 11 gives high tones with increased rate of climb (positive vertical component of speed), and deeper tones with increased sinking speed (negative vertical component of speed). As acoustic oscillator, in particular an astable multivibrator with linearly rising frequency is suitable.

The output voltages of the amplifier 7, which with the polarity of the battery shown correspond to positive output voltages of the bridge, i.e. are called forth by air flows from left to right, actuate a chopper 9, which chops the oscillator vibrations associated with the climb region. In this way the pilot receives unequivocal acoustic evidence of whether his aircraft is rising or sinking, and at what speed it is moving upwardly or downwardly. When the sound becomes deeper but still sounds intermittently, this means that though the climbing rate has become less, the vertical movement is still upwards; if the sound becomes even deeper and sounds continuously, the pilot knows that he is moving downwardly, and in accordance with the frequency he knows whether it is at greater or lesser speed. This double sound principle provides maximum indicating safety, and after some practice makes it unnecessary for the instruments to be observed, thus increasing safety in flight. The prerequisites for its fail-safe functioning are moreover the zero point stability obtained with the probe described above and the thereby guaranteed exact starting-up or stopping of the chopper 9 on each change in the polarity of the bridge output voltage.

It can be seen from the above that the arrangement described can easily be used also without the indicating instrument 8, whereas it cannot function if only the indicating instrument is provided and the acoustic indication is disconnected or removed. With acoustic and optical indication, a double reliability is obtained which is of particular service for use in aircraft, as described above. On the other hand, if the arrangement is introduced in other spheres where the flow speed of gases is to be ascertained one can omit one of the two indicating systems.

Finally, the construction of the probe will be described. As already mentioned it consists of two coilings 21, 22 each in the form of a truncated cone, with their small top surfaces facing each other. A pure metal wire is used as material, and in a practical embodiment use was made of nickel wire of 0.03 mm. cross section, with external insulation. This wire is wound on a suitable coiling spine of the conical shape shown, and the coiling before being drawn off from the coiling spine is fixed with an adhesive, i.e. here and there dipped in adhesive in order to hold the windings in the desired shape. Thereupon two coilings of this type are placed in the groove of a metal block 23, and their terminals are brought out below through the bores provided there. Optionally the terminals can be placed fixedly in the boreholes by means of wax with high melting point or the like. If necessary all parts of the coilings may be painted over with a temperature-resistant lacquer, which after being heated for several hours hardens out at a temperature of for instance 150° C. The adhesive previously applied volatilizes during this hardening process. The wax in the bores, however, becomes temporarily soft and now fills the holes completely. Accordingly after the cooling, the probe is fixed exactly in the groove of the block 23, and is self-supporting, i.e. without holder, clamp or other supplementary means which might prejudice the measurement result. The block 23 is then screwed, riveted or fixed in some similar way to a suitable counterpart. Only the winding terminals remain accessible from the outside, which are connected to the electric part, and the flow channel which passes as groove through the block 23 and which is connected by means of hoses or the like to the compensator vessel 1 and to the tap place for the static pressure 3.

We claim:

1. A sensitive gas direction and velocity measuring apparatus comprising a temperature-sensitive measurement probe contained in a housing through which the gas passes, said probe consisting of two coilings of metal wire each formed as a truncated cone, connected in series, and arranged so that their truncated ends are adjacent each other to form a double frusto-cone whose axis is parallel the flow gas; a resistance bridge-circuit of which said probe is a part; an amplifier connected to the output voltage of said bridge; and an oscillator with connected transducer for acoustic indication of the direction and velocity and an indicating instrument for visual indication of the direction and velocity connected to said amplifier.

2. Apparatus as claimed in claim 1 wherein said probe is coated with lacquer to hold it in the double frusto-cone shape and make it self-supporting.

3. Apparatus as claimed in claim 1 wherein said metal wire is insulated nickel wire.

4. Apparatus as claimed in claim 1 wherein said amplifier has means for reversing its range; said oscillator and the output voltages of said bridge which brings about a rising indication value of said indication instrument increases the frequency of said oscillator, and the output voltages which bring about a dropping indication value of said indication instrument decreases the frequency of said oscillator.

5. Apparatus as claimed in claim 4 wherein a chopper is provided in parallel with said oscillator, said chopper is also controlled by said output voltages of said bridge and can be activated only by an output voltage corresponding to a predetermined indication direction.

References Cited

UNITED STATES PATENTS

| | | | |
|---|---|---|---|
| 2,214,181 | 9/1940 | Rylsky | 73—179 |
| 2,358,571 | 9/1944 | Hall | 73—182 X |
| 2,892,347 | 6/1959 | Laprand | 73—204 |
| 3,251,225 | 5/1966 | Luft | 73—204 |
| 3,363,463 | 1/1968 | Wheeler | 73—179 X |

RICHARD C. QUEISSER, *Primary Examiner.*

JERRY W. MYRACLE, *Assistant Examiner.*

U.S. Cl. X.R.

73—204; 338—299, 333